(12) United States Patent
Kao

(10) Patent No.: US 6,765,433 B1
(45) Date of Patent: Jul. 20, 2004

(54) LOW POWER IMPLEMENTATION FOR INPUT SIGNALS OF INTEGRATED CIRCUITS

(75) Inventor: Oliver C. Kao, Cupertino, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/393,583

(22) Filed: Mar. 20, 2003

(51) Int. Cl.$^7$ .............................................. G05F 1/10
(52) U.S. Cl. ........................ 327/544; 327/185; 713/326; 365/227
(58) Field of Search ................................. 327/142, 198, 327/199, 544, 108, 185, 18, 20, 24; 365/227, 233, 233.5; 326/56–58; 713/320, 322, 323

(56) References Cited

U.S. PATENT DOCUMENTS 6,058,063 A * 5/2000 Jang ........................... 365/227
6,266,294 B1 * 7/2001 Yada et al. .................. 327/198
2002/0135398 A1   9/2002 Choi et al. ..................... 326/93
2002/0162037 A1  10/2002 Woods et al. ................ 713/322

* cited by examiner

*Primary Examiner*—Long Nguyen
(74) *Attorney, Agent, or Firm*—Thomas Schneck

(57) ABSTRACT

Integrated circuit device that uses tristate switching means to disconnect input/output pins from input buffers during a power down mode, thereby preventing current leakage through partially turned on MOS transistors inside input buffers. A transition detection means connected between the input/output pins and the controlling inputs of the tristate switching means monitors electronic signal at the input/output pins while the chip is in a power-down mode and turns on the tristate switching means when a signal transition is detected.

16 Claims, 3 Drawing Sheets

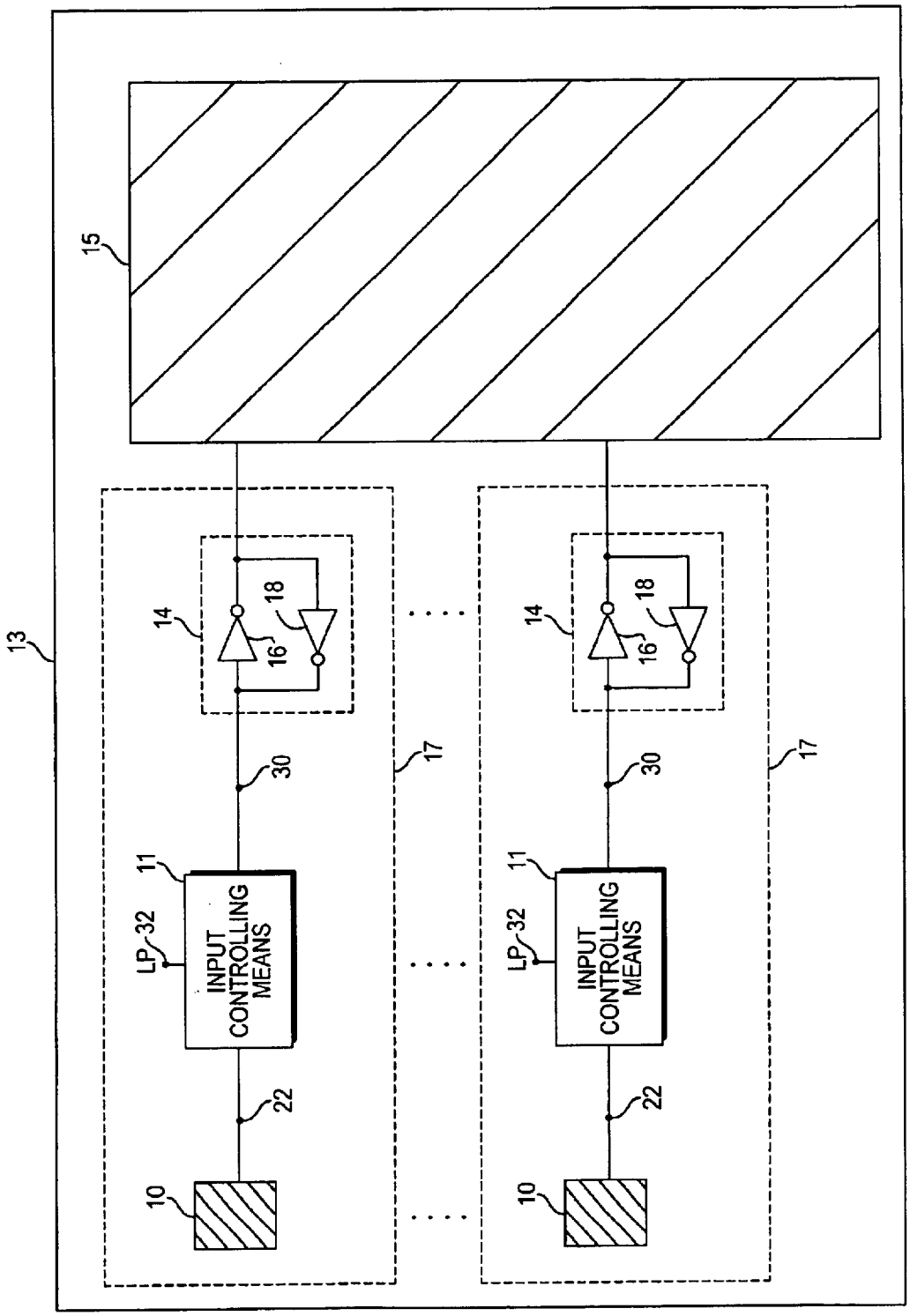
Fig._1

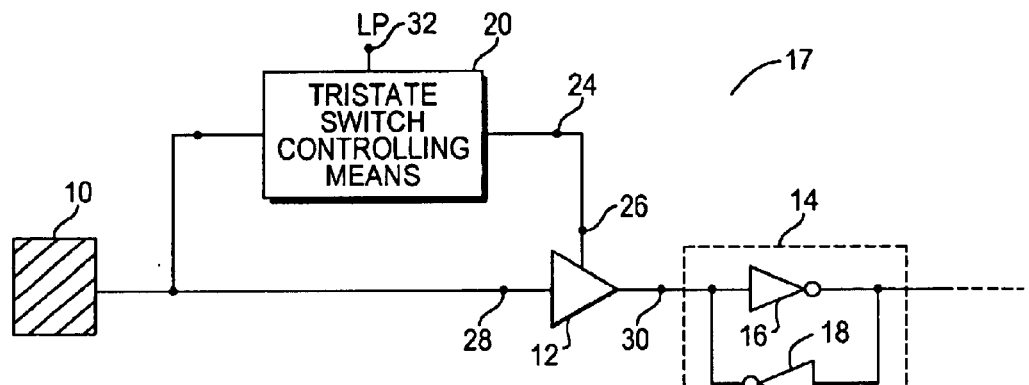
Fig._2
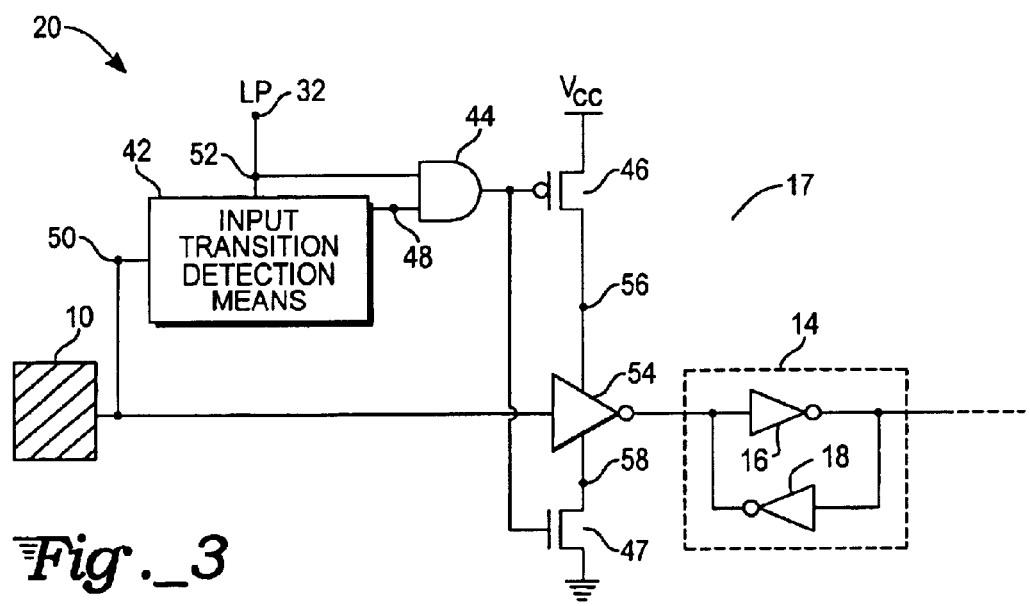
Fig._3

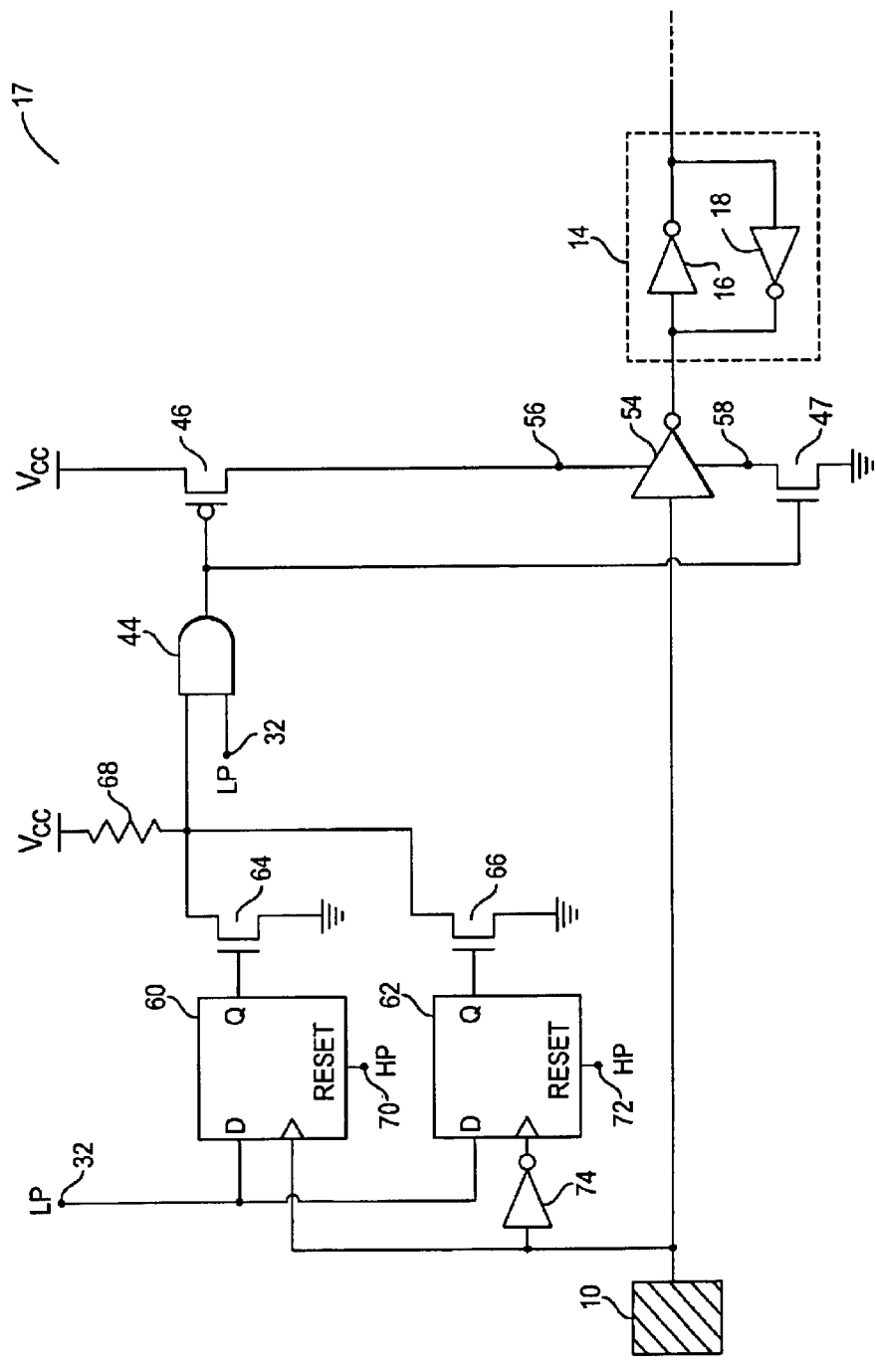
Fig._4

LOW POWER IMPLEMENTATION FOR INPUT SIGNALS OF INTEGRATED CIRCUITS

TECHNICAL FIELD

The present invention relates to power management in integrated circuits, and in particular, to the prevention of current leakage in JTAG enabled integrated devices.

BACKGROUND ART

In a TTL compatible chip, each input/output pin on the chip is frequently connected directly to an inverter, which constitute a part of an input buffer. Often, the inverter is formed by having a PMOS transistor and a NMOS transistor joined to one another at their drains. The source of the PMOS device is connected to a power supply, and the source of NMOS device is connected to a ground. In a typical TTL compatible chip that is powered by a 5V power supply source, a legitimate low input signal could range anywhere from −0.5V to 0.8V. Given a low input signal that is near its upper legitimate value of 0.8V, the PMOS transistor in the inverter would be on while the NMOS transistor, which is supposed to be off, would be partially turned on because the voltage at its gate is higher than its threshold voltage. As a result, leakage current would go from the power supply through the PMOS transistor and then through the NMOS transistor to ground. A similar leakage phenomenon is possible for the PMOS transistors as well, albeit the leakage occurs while the input signal is within the legitimate high range from 2V to (Vcc+0.5)V. Given a high input that is near 2V, the NMOS transistor in the inverter would be on while the PMOS transistor, which is supposed to be off, would be partially turned on because the gate to source voltage is more negative than the threshold voltage. As a result, leakage current would go from the power supply through the PMOS transistor and then through the NMOS transistor to ground. Such partial leakage phenomenon is not limited to IC with 5V power supply. Similar problems exist in IC with 3.3V, 2.5V and 1.8V power supply.

A way to prevent such current leakage is to place a second PMOS transistor between the power supply and the first PMOS transistor and a second NMOS transistor between the first NMOS transistor and the ground. The gate of the second PMOS transistor and the gate of the second NMOS transistor would be connected to a low-power signal line that carries an asserted signal only when the chip is in a low-power mode. That way, the power supply would be effectively cut off from the first PMOS transistor and the ground would be effectively cut off from the first NMOS transistor, thereby eliminating the pathway of current leakage.

Although this method works well in preventing current leakage, it is not suitable for chips with boundary scan capability, or chips with ISP (in-system programming) capability. For chips with the boundary scan capability as prescribed by JTAG, the input/output pins must still be ready to receive a signal when the chip is in a power-down mode. For ISP chips, the interface pins also need to be active during power-down mode. The method described above could effectively reduce current leakage while the chip is in power-down mode but the input/output pins would not be responsive to any input signal until the chip is powered up again. Therefore, it would be desirable to have an input/output system that could be turned off during the power-down mode to reduce current leakage but can be reactivated when a signal is detected at its input/output pins.

SUMMARY OF THE INVENTION

The present invention teaches the incorporation of a tristate switching means between each input/output pin and each input buffer with the state of each tristate switching means being controlled by an input transition detection means. The tristate switching means are activated while the chip is in normal high power operation mode, allowing a direct connection between the input/output pins and the input buffers. When the chip goes into power-down mode and a low-power signal is received by the input transition detection means, the tristate switching means are turned off, effectively disconnecting the input/output pins from the input buffers, thereby preventing the leakage of current through partially turned on NMOS or PMOS transistors in the inverters found inside the input buffers. However, when an input signal transition is detected by the input transition detection means, the tristate switching means is turned on again to allow the transmission of the input signal to the input buffer.

BRIEF DESCRIPTION OF THE DRAWINGS

FIG. 1 is a block diagram showing a general view of the present invention.

FIG. 2 is a block diagram showing an alternate embodiment of the circuit shown in FIG. 1.

FIG. 3 is a block diagram showing another alternate embodiment of the circuit shown in FIG. 1.

FIG. 4 is a circuit diagram of the device shown.

BEST MODE FOR CARRYING OUT THE INVENTION

An exemplary embodiment of the present invention is disclosed herein with reference to FIGS. 1–4. FIG. 1 includes an integrated circuit 13 having multiple signal input circuits 17. With reference to FIGS. 2–4, detailed implementations of the signal input circuits 17 are shown. Referring to FIG. 1. each signal input circuit includes an input/output pin 10 coupled to an input latch 14 through an input controlling means 11. The signal input circuit feeds into a main circuit area 15 where the received signals are processed. The signal input circuit 17 disclosed in the present invention can be used in any integrated circuit where the prevention of current leakage during power down mode is desired. For instance, a JTAG capable chip may use the present invention to reduce current leakage during a standby/power-down mode.

As shown in FIG. 1, the input controlling means 11 includes a first input terminal 22 that is connected to the input/output pin 10, a second input terminal 32 that is connected to a low power (LP) signal line, and an output terminal 30 that is connected to the input latch 14. The input latch 14 is composed of a first inverter 16 and a second inverter 18 cross-connected such that the output of the first inverter 16 is connected to the input of the second inverter 18 while the output of the second inverter 18 is connect to the input of the first inverter 16. An input latch 14 has been used in the present circuit as an example. The present invention may also be used to prevent current leakage in any input buffer that uses MOS transistors.

At times, the input/output pin 10 may be used for outputting signal as well. A separate output circuit is usually connected to the input/output pin 10. Three-way switches are usually used to control whether the input/output pin 10 is outputting data or inputting data. However, since such output circuitry has no bearing on the present invention, they are not shown in the figures.

When the LP line is not asserted, i.e. when the chip is in normal operating mode (or high-power (HP) mode), the input controlling means 11 connects the input/output pin 10 to the input latch 14, thereby allowing input signal to be transmitted from the input/output pin 10 to the input latch 14. When the LP line is asserted, i.e. when the chip is in a power-down mode, the input controlling means 11 disconnects the input/output pin 10 from the input latch 14; isolating the gates of the MOS transistors from the noisy input/output pin, thereby eliminating the possibility of current leakage caused by partially turned on transistors inside the input latch 14. However, while the chip is still in the power-down mode, the input controlling means 11 continuously monitors the input signal at the first input terminal 22. If an input signal transition is detected at the first input terminal 22, the input controlling means 11 will reconnect the input/output pin 10 to the input latch 14, thereby allowing the transmission of data signal from the input/output pin 10 to the input latch 14 in the low-power mode.

In FIG. 2, the input/output pin 10 is shown to be connected to an input terminal 28 of a tristate switching means 12. An output terminal 30 of the tristate switching means 12 is connected to the input latch 14. A controlling input terminal 26 of the tristate switching means 12 is connected to an output terminal 24 of an tristate switch controlling means 20. An input terminal 22 of the tristate switch controlling means 20 is connected to the input/output pin 10. Another input terminal 32 of the tristate switch controlling means 20 is connected to the low-power (LP) signal line wherein an asserted signal will be presented in the line when the chip is in a power-down mode.

When the LP line is not asserted, an assertive signal would be generated at the output terminal 24 of the tristate switch controlling means 20, thereby turning on the tristate switching means 12 and connecting the input/output pin 10 to the input latch 14. When the LP line is asserted, i.e. when the chip is in a power-down mode, the assertive signal would be taken away from the output terminal 24 of the tristate switch controlling means 20, thereby turning off the tristate switching means and disconnecting the input/output pin 10 from the input latch 14. However, while the chip is still in the power-down mode, the output terminal 24 of the tristate switch controlling means 20 may present an assertive signal again whenever a signal transition is detected at the input/output pin 10, thereby reconnecting the input/output pin 10 to the latch 14 by activating the tristate switching means 12.

FIG. 3 shows the tristate switch controlling means 20 having a 2-input AND gate 44, which has an output that is connected to the gate of a PMOS transistor 46 and the gate of an NMOS transistor 47, a first input terminal that is connected to the LP signal line 32, and a second input terminal that is connected to an output terminal 48 of an input transition detection means 42 with two inputs. A first input terminal 52 of the input transition detection means 42 is connected to the LP signal line 32, while a second input terminal 50 of the input transition detection means 42 is connected to the input/output pin 10. The source of the PMOS transistor 46 is connected to a power supply Vcc and the drain of the PMOS transistor 46 is connected to the power terminal 56 of a tristated inverter 54. The drain of the NMOS transistor 47 is connected to the ground terminal 58 of the inverter 54 while the source of the NMOS transistor 47 is connected to ground.

While the chip is in HP mode (the signal in the LP line is low), the output of the AND gate 44 is always low, which keeps the PMOS transistor 46 on and the NMOS transistor 47 off, thereby enabling data transmission from the input/output pin 10 to the input latch 14. When the chip goes into power-down mode, the signal at the LP line goes high. As a result, the output signal of the AND gate 44 will depend solely on the output 48 of the input transition detection means 42. Absent any signal at the input/output pin 10 (i.e. no input transition or toggle), the output of the input transition detection means 42 will be high, thereby ensuring a high signal at the output terminal of the AND gate 44, which in turns ensures that the PMOS transistor 46 is off and the NMOS transistor 47 is on. As a result, the tristated inverter 54 is deactivated and the input latch 14 would be isolated from the input/output pins 10, thereby eliminating the possibility of the transistors in the latch inverters 16 and 18 being partially turned on in LP mode by signals in the input/output pin 10.

However, once an input signal transition at input terminal 50 is detected by the input transition detection means 42, the output 48 of the input transition detection means 42 will go low, thereby ensuring a low signal at the output of the AND gate 44, which in turn switches on the PMOS transistor 46 and the NMOS transistor 47. As a result, the tristated inverter 54 is activated and signals at the input pins 10 would be transmitted to the input latch 14. Although the tristate inverter 54 is directly connected to the input output pin 10 in power down mode, both the PMOS transistor 46 and the NMOS transistor 47 are off, thereby preventing current leakage.

FIG. 4 shows a preferred embodiment of a transition detection circuit that will detect either a signal transition from low to high or a signal transition from high to low. The circuit comprises of a first D-25 flip flop (DFF) 60, a second D-flip flop 62, a first NMOS transistor 64, a second NMOS transistor 66, and a resistive element 68, which could be a resistor, a PMOS pull up or any equivalent element that is well known in those skilled in the art. The D input terminals of both DFF are connected to the LP signal line 32. The clock input terminal of the first DFF is connected to the input/output pin 10 and the clock input terminal of the second DFF is connected to the input/output pin 10 through a second inverter 74. The Q output terminals of the first and second DFF are connected to the gates of the first and second NMOS transistors respectively. The RESET terminals of the DFF are connected to a HP signal line 70, which carries a complementary signal of the LP signal line 32. The drains of the NMOS transistors 64 and 66 are connected to a terminal of the resistive element 68 and the second input of the AND gate 44. The other terminal of the resistive element 68 is connected to a power supply Vcc. The sources of the NMOS transistors are connected to a ground.

While the chip is in normal HP mode, the LP signal line 32 carries a low signal while the HP signal line carries a high signal. Consequently, both DFF are in reset mode, which dictates that the Q outputs of both DFF carry a low signal. With a low signal output at both DFF, both NMOS transistors will be turned off. As a result, the signal at the second input terminal of the AND gate 44 will be high. However, since the first input terminal of the AND gate 44 receives signal from the LP signal line 32 and the LP signal line is carrying a low signal, the output of the AND gate is low. Consequently, the inverter 54 stays active.

Once the chip goes into a power down mode, the signal in the LP signal line 32 goes from low to high and the signal in the HP signal line goes from high to low. As a result, the output of the AND gate 44 depends solely on the output of the input transition detection means 42. Absent any signal transition in the input/output pin 10, the Q outputs of both DFF remain at their initial low state. The NMOS transistors remain in an off state and the second input terminal of the AND gate 44 remain high. Since the signal at the first input terminal of the AND gate 44, which is connected to the LP signal line, is high as well, the output of the AND gate 44 goes high. As a result, the PMOS transistor 46 is turned off, which results in the deactivation of the inverter 54 and the cutting off of the leakage current.

In the event that the input signal at the input/output pin 10 transits from low to high, the LP signal presented at the D input of the first DFF 60, which is high, will be carried over to its Q output. Consequently, the first NMOS transistor 64 is turned on, connecting the second input terminal of the AND gate 44 to ground, which in turn drives the output terminal of the AND gate 44 low. The low signal output from the AND gate 44 switches on the PMOS transistor 46 and reactivates the tristated inverter 54. In the event that the input signal at the input/output pin 10 transits from high to low, the LP signal presented at the D input of the second DFF 62, which is high, will be carried over to its Q output. The high signal at the Q output of the second DFP 62 turns on the second NMOS transistor 66, connecting the second input terminal of the AND gate 44 to the ground. The low signal at the input terminal of the AND gate ensures a low signal output and that in turn switches on the PMOS transistor 46.

With the first DFF 60 acting as a detection device for positive transition of the input signal from low to high and the second DFF 62 acting as a detection device for the negative transition of the input signal from high to low, the input transition detection means 42 is capable of detecting any input toggles. Once an input toggle is detected, it sends activating signal to the tristated inverter 54, thereby enabling signal transmission from the input/output pin 10 to the input latch 14.

What is claimed is:

1. An integrated circuit having a plurality of signal input circuits, each signal input circuit comprising:

an input/output pin;

an input buffer associated with said pin; and means for controlling connection of said pin to said input buffer, said means for controlling having a first input connected to said pin, a second input connected to a low-power signal line, and an output connected to said input buffer, said means for controlling responsive to an input signal transition on said pin and a low-power control signal asserted on said low-power signal line which is indicative of said powered-down mode of the integrated circuit, such that a) whenever the low-power control signal is not asserted, said pin being connected to said input buffer by said means for controlling, b) whenever the low-power control signal is asserted and no input signal transition is sensed at said first input by said means for controlling, said pin being isolated from the input buffer by said means for controlling, thereby preventing current leakage through the input buffer, and c) whenever the low-power control signal is asserted and an input signal transition is sensed at said first input by said means for controlling, said pin being reconnected to the input buffer by said means for controlling.

2. The integrated circuit of claim 1, wherein each said means for controlling comprises a tristate switching means and a tristate switch controlling means, the first input of said means for controlling connected to a data signal input terminal of said tristate switching means and to a transition sense input of said tristate switch controlling means, the second input of said means for controlling being a control signal input of said tristate switch controlling means, the output of said means for controlling being a data signal output terminal of said tristate switching means, the output of said tristate switch controlling means being connected to a tristate control input terminal of said tristate switching means, said tristate switch controlling means being responsive to said input signal transition sensed at the transition sense input and to the low-power control signal received at the control signal input to activate or inactivate said tristate switching means, such that a) whenever the low-power control signal is not being asserted, the tristate switching means is activated by said tristate switch controlling means, b) whenever the low-power control signal is asserted and no input signal transition is sensed by said tristate switch controlling means at the transition sense input, the tristate switching means is inactivated by said tristate switch controlling means, and c) whenever a low-power control signal is asserted and said input signal transition is sensed by said tristate switch controlling means at the transition sense input, the tristate switching means is reactivated by said tristate switch controlling means.

3. The integrated circuit of claim 2, wherein each said tristate switch controlling means comprises:

an AND logic gate having first and second input terminals and an output terminal, the output terminal connected to said tristate switching means; and input transition detection means having first and second inputs and an output, the first input thereof forming the transition sense input of said tristate switch controlling means, the control signal input of said tristate switch controlling means connected to both the second input of the input transition detection means and the first input of the AND logic gate, the output of the input transition detection means being connected to the second input of said AND logic gate, the input transition detection means generating a low voltage level at its output whenever an input signal transition is sensed at its first input and the low-power control signal is present at its second input.

4. The integrated circuit of claim 2, wherein said tristate switch means comprises of a PMOS transistor and an NMOS transistor, the source of said PMOS transistor being connected to a power supply, the drain of said PMOS being connected to the power terminal of an inverter, the drain of said NMOS transistor being connected to the ground terminal of said inverter, the source of said NMOS transistor being connected to a ground, the gates of said NMOS and PMOS transistor being connected to said tristate control input terminal, the input of said inverter being connected to said data signal input terminal of said tristate switching mean, the output of said inverter being connected to said data signal output terminal of said tristate switching means.

5. The integrated circuit of claim 3, wherein each input transition detection means comprises a first D-flip flop and a second D-flip flop, data input terminals of said D-flip flops being connected to said first input terminal of said input transition detection means, data output terminals of said first and said second D-flip flops being respectively connected to gates of a first NMOS transistor and a second NMOS transistor, a clock input of said first D-flip flop being directly connected to said second input terminal of said input transition detection means, a clock input of said second D-flip flop being indirectly connected to said second input terminal of said input transition detection means through an inverter, drains of both said first and second NMOS transistors being connected to a first terminal of a resistive element as well as to said second input terminal of said AND gate, sources of both said first and second NMOS transistors being connected to a ground terminal, a second terminal of said resistor being connected to a power supply.

6. The integrated circuit of claim 5, wherein said resistive element is a resistor.

7. The integrated circuit of claim 5, wherein said resistive element is a MOS type pull up element.

8. An integrated circuit having means for reducing power leakage during low power mode, said means comprising:
  a plurality of input/output pins;
  a plurality of input buffers;
  a plurality of tristate switching means each having a data signal input terminal, a data signal output terminal, and a controlling input terminal, said data signal input terminal are connected to said output terminal when said controlling input terminal receives an activation signal, said data signal input terminal being disconnected from said data signal output terminal when said controlling input terminal receives an inactivation signal, said signal input terminal further connects to a respective one of said plurality of input/output, pins, said signal output terminal further connects to a respective one of buffers; and
  a plurality of tristate switch controlling means each having a first input terminal connected a low-power signal line that is asserted only during the low-power mode, a second input terminal connected to the respective one of plurality of input/output pins, and an output terminal that is connected to said controlling input terminal of a respective one of said plurality of tristate switching means, whereby an asserted signal in said first input terminal of the respective one of said plurality of tristate switch controlling means coupled with a lack of signal transition in said second input terminal of the respective one of said plurality of tristate switch controlling means lead to the generation of an inactivating signal at said controlling input terminal of the respective one of said plurality of tristate switching means, whereby the asserted signal in said first input terminal of the respective one of plurality of tristate switch controlling means coupled with a signal transition in said second input terminal of the respective one of said plurality of tristate switch controlling means generate an activating signal at said controlling input terminal of the respective one of said plurality of tristate switching means.

9. The integrated circuit of claim 8, wherein each said tristate switch controlling means further comprising:
  a 2-input AND gate having a first input terminal, a second input terminal, an output terminal, the first input terminal being connected to said low-power signal line; and
  an input transition detection means having a first input terminal that is connected to said low-power signal line, a second input terminal that is connected to the respective one of said plurality of input/output pins, and an output terminal that is connected to said second input terminal of said AND gate, wherein a signal transition detected at said second input terminal of said input transition detection means generates a low signal at the output terminal of said input transition detection means.

10. The integrated circuit of claim 8, wherein each said tristate switching means comprising:
  a PMOS transistor and an NMOS transistor each having a gate terminal that is connected to said output terminal of said tristate switch controlling means, the source terminal of said PMOS transistor being connected to a power source, and the drain terminal of said PMOS transistor being connected to a power terminal of the drain of said NMOS transistor being connected to the ground terminal of said inverter, the source of said NMOS transistor being connected to a ground, the input of said inverter being connected to said data signal input terminal of said tristate switching means, the output of said inverter being connected to said data terminal of said tristate switching means.

11. The integrated circuit of claim 9, wherein each input transition detection means comprises of a first and a second D-flip flop, the data terminals of said D-flip flops being connected to said first input terminal of said input transition detection means, the output terminals of said first and said second D-flip flop being connected to the gates of a first NMOS transistor and a second NMOS transistor respectively, the clock input of said first D-flip flop being connected to said second input terminal of said input transition detection means, the clock input of said second D-flip flop being connected to said second input terminal of said input transition detection means through a second inverter, the drains of said NMOS transistors being connected to a terminal of a resistive element as well as said second input terminal of said AND gate, the sources of said NMOS transistors being connected to a ground terminal, the other terminal of said resistive element being connected to a power supply.

12. The integrated circuit of claim 11, wherein a reset inputs of said D-flip flops being connected to a high-power signal line that carries a signal that is complementary to signals in said low-power signal line.

13. The integrated circuit of claim 11, wherein said resistive element is a resistor.

14. The integrated circuit of claim 11, wherein said resistive element is of MOS type pull up element.

15. A method for reducing current leakage when a JTAG compatible chip goes into a power-down mode, said chip having a plurality of input/output pins connecting to a plurality of input buffers, said method comprising the steps of:

a) providing an input controlling means between each of said plurality of input/output pins and each of said input buffers, said input controlling means each having a first and second input terminals and an output terminal, said first input terminals being connected to said input/output pins, said output terminals being connected to said input buffers, data signal at said input/output pins being transmitted to said input buffers by said input controlling means whenever the JTAG compatible chip is in a high power mode;

b) sensing a low-power signal at said second input terminal of said input controlling means, said input controlling means disabled data transmission from said input/output pins to said input buffers;

c) sensing a signal transition at said first input terminal of said input controlling means, said input controlling means reenables data transmission from said input/output pins to said input buffers.

16. The method of claim 15, wherein said disabling and reenabling of data transmission from said input/output pins to said input buffers in steps b) and c) are carried out by a tristate switching means which is responsive to the sensing of said low-power signal at said second input terminal of said input controlling means and the sensing of said signal transition at said first input terminal of said input controlling means.

* * * * *

UNITED STATES PATENT AND TRADEMARK OFFICE
CERTIFICATE OF CORRECTION

PATENT NO.    : 6,765,433 B1
DATED         : July 20, 2004
INVENTOR(S)   : Oliver C. Kao It is certified that error appears in the above-identified patent and that said Letters Patent is hereby corrected as shown below:

Column 7,
Lines 61-63, "...pins, said signal output terminal further
            connects to a respective one of buffers; and"
            should read:
            -- ... pins, said signal output terminal further
                connects to a respective one of said input
                buffers; and ---

Column 7, lines 67 to column 8, line 1,
"... input terminal connected to the
respective one of plurality of input/output pins, ...".
should read:
-- ... input terminal connected to a respective one
        of said plurality of input/output pins, ... --.

Column 8,
Lines 12-13, "... said first input terminal of the respective one
            of plurality of tristate switch ..." should read:
            -- ... said first input terminal of a respective one
            of said plurality of tristate switch... --.

Signed and Sealed this

Fourteenth Day of December, 2004

JON W. DUDAS
*Director of the United States Patent and Trademark Office*